United States Patent
Kim et al.

(10) Patent No.: US 11,429,005 B2
(45) Date of Patent: Aug. 30, 2022

(54) OPTICAL DEVICE

(71) Applicant: LG Chem, Ltd., Seoul (KR)

(72) Inventors: Nam Hun Kim, Daejeon (KR); Byoung Kun Jeon, Daejeon (KR); Doo Young Huh, Daejeon (KR); Su Young Ryu, Daejeon (KR); Seong Min Lee, Daejeon (KR); Jung Woon Kim, Daejeon (KR); Young Shin Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/734,059

(22) PCT Filed: Jul. 18, 2019

(86) PCT No.: PCT/KR2019/008865
§ 371 (c)(1),
(2) Date: Dec. 1, 2020

(87) PCT Pub. No.: WO2020/036322
PCT Pub. Date: Feb. 20, 2020

(65) Prior Publication Data
US 2021/0223602 A1    Jul. 22, 2021

(30) Foreign Application Priority Data

Aug. 14, 2018 (KR) .................. 10-2018-0094738

(51) Int. Cl.
*G02F 1/137* (2006.01)
*G02F 1/1335* (2006.01)
(Continued)

(52) U.S. Cl.
CPC ............ *G02F 1/13725* (2013.01); *B60J 1/20* (2013.01); *G02F 1/1337* (2013.01); *G02F 1/133528* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 2005/0068629 | A1 | 3/2005 | Fernando et al. |
| 2005/0134750 | A1 | 6/2005 | Yano |

(Continued)

FOREIGN PATENT DOCUMENTS

| | | | |
|---|---|---|---|
| CN | 102004393 B | 5/2013 | |
| CN | 103492333 A | 1/2014 | |

(Continued)

OTHER PUBLICATIONS

Soneleastic "Modulus of elasticity and Poisson's coefficient of polymeric materials" https://www.sonelastic.com/en/fundamentals/tables-of-materials-properties/polymers.html (Year: 1996).*

(Continued)

*Primary Examiner* — Phu Vu
(74) *Attorney, Agent, or Firm* — Lerner, David, Littenberg, Krumholz & Mentlik, LLP (57) ABSTRACT

An optical device is provided in the present application. The optical device of the present application has varying transmittance and improved appearance defects, such as reduction of wrinkles that may occur by lamination of a liquid crystal element and an outer substrate. Such optical device can be used for various applications such as eyewear, for example, sunglasses or AR (augmented reality) or VR (virtual reality) eyewear, an outer wall of a building or a sunroof for a vehicle.

13 Claims, 3 Drawing Sheets

(51) Int. Cl.
  *G02F 1/1337* (2006.01)
  *B60J 1/20* (2006.01)

(56) References Cited

U.S. PATENT DOCUMENTS

| | | |
|---|---|---|
| 2005/0238967 A1 | 10/2005 | Rogers et al. |
| 2006/0098290 A1* | 5/2006 | Fernando .......... B32B 17/10339 359/609 |
| 2014/0049708 A1 | 2/2014 | Murata et al. |
| 2014/0132132 A1 | 5/2014 | Chowdhury et al. |
| 2018/0208500 A1 | 7/2018 | Lee et al. |
| 2018/0224689 A1 | 8/2018 | DeMiglio et al. |
| 2019/0079327 A1 | 3/2019 | Kim et al. |
| 2019/0107742 A1 | 4/2019 | Jeon et al. |
| 2020/0285107 A1 | 9/2020 | Park et al. |

FOREIGN PATENT DOCUMENTS

| | | |
|---|---|---|
| CN | 107664788 A | 2/2018 |
| JP | S61269125 A | 11/1986 |
| JP | H0719717 A | 1/1995 |
| JP | 200469978 A | 3/2004 |
| JP | 2007515661 A | 6/2007 |
| JP | 200936967 A | 2/2009 |
| JP | 2017062361 A | 3/2017 |
| KR | 20060087600 A | 8/2006 |
| KR | 20170037567 A | 4/2017 |
| KR | 20170064744 A | 6/2017 |
| KR | 20170072573 A | 6/2017 |
| KR | 20180059370 A | 6/2018 |
| TW | 200520990 A | 7/2005 |
| TW | 201249644 A | 12/2012 |
| WO | 2005031437 A1 | 4/2005 |

OTHER PUBLICATIONS

Professional Plastics "Mechanical Properties of Plastic Materials" https://www.professionalplastics.com/professionalplastics/ MechanicalPropertiesofPlastics.pdf (Year: 2021).*
International Search Report for Application No. PCT/KR2019/ 008865 dated Oct. 23, 2019, 2 pages.
Taiwan Search Report for Application No. 108126518 dated Jun. 9, 2019, 1 page.

* cited by examiner

OPTICAL DEVICE

CROSS-REFERENCE TO RELATED APPLICATION

This application is a national phase entry under 35 U.S.C. § 371 of International Application No. PCT/KR2019/008865 filed Jul. 18, 2019, which claims priority from Korean Patent Application No. 10-2018-0094738 filed on Aug. 14, 2018, the disclosure of which are incorporated herein by reference in their entirety.

TECHNICAL FIELD

The present application relates to an optical device.

BACKGROUND ART

Various optical devices are known, which are designed so that transmittance can be varied using liquid crystal compounds.

For example, transmittance-variable devices using a so-called GH cell (guest host cell), to which a mixture of a host material and a dichroic dye guest is applied, are known, and in the device, a liquid crystal compound is mainly used as the host material.

Such transmittance-variable devices are applied to various applications including eyewear such as sunglasses and eyeglasses, outward walls of a building or sunroofs of a vehicle, and the like.

DISCLOSURE

Technical Problem

It is an object of the present application to provide an optical device capable of varying the transmittance and with improved appearance defects such as reduction of wrinkles that may occur by lamination of a liquid crystal element and an outer substrate.

Technical Solution

The present application relates to an optical device. The optical device comprises a liquid crystal element having a structure in which a first base layer, a liquid crystal layer and a second base layer are sequentially laminated.

Figure 1:
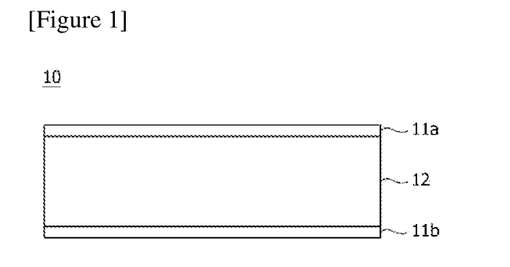
FIGS. 1 to 2 are exemplary cross-sectional views of liquid crystal elements that can be used in an optical device of the present application.

FIG. 1 exemplarily shows a liquid crystal element according to one example of the present application. As shown in FIG. 1, the liquid crystal element (10) may have a structure in which the first base layer (11a), the liquid crystal layer (12), and the second base layer (11b) are sequentially laminated. In addition, the expressions of first and second do not prescribe the front-and-rear or up-and-down relationship of the base layers.

As one example, one or more of the first base layer (11a) and the second base layer (11b) constituting the liquid crystal element (10) may have a flexural rigidity (D) of about $2.2*10^{-4}$ N·m or more, as represented by Equation 1 below.

$$D = \frac{Eh_e^3}{12(1-v^2)} \quad \text{[Equation 1]}$$

In Equation 1 above, D is the flexural rigidity of the base layer, E is the Young's modulus of the base layer, $h_e$ is the thickness of the base layer, and $v$ is the Poisson's ratio of the base layer.

In another example, the flexural rigidity (D) of Formula 1 above may be about $2.2*10^{-4}$ N·m or more, $4*10^{-4}$ N·m or more, $6*10^{-4}$ N·m or more, $8*10^{-4}$ N·m or more, $10*10^{-4}$ N·m or more, $20*10^{-4}$ N·m or more, $30*10^{-4}$ N·m or more, $40*10^{-4}$ N·m or more, or about $50*10^{-4}$ N·m or more, and the upper limit is not particularly limited, but may be about 1 N·m or less, $5*10^{-1}$ N·m or less, $1*10^{-1}$ N·m or less, $5*10^{-1}$ N·m or less, or about $1*10^{-2}$ N·m or less.

When the base layer satisfies the flexural rigidity (D) in the above range, appearance defects such as wrinkles may be reduced at the time that the liquid crystal element comprising the base layer is laminated with an outer substrate, which is described below, to manufacture an optical device.

As one example, in each of the first base layer and the second base layer, the flexural rigidity (D) of Equation 1 above may be about $2.2*10^{-4}$ N·m or more. When the flexural rigidity of the first and second base layers satisfies the above range, the appearance defects of the optical device can be reduced more efficiently.

In one example, each of the first base layer and the second base layer may have a Young's modulus (E) of about $1*10^9$ N/m² to about $1*10^{10}$ N/m². In another example, the Young's modulus (E) of the base layer may be about $1.2*10^9$ N/m² or more, $1.4*10^9$ N/m² or more, $1.6*10^9$ N/m² or more, or about $1.8*10^9$ N/m² or more, and may be about $9*10^9$ N/m² or less, $8*10^9$ N/m² or less, $7*10^9$ N/m² or less, $6*10^9$ N/m² or less, $5*10^9$ N/m² or less, $4*10^9$ N/m² or less, or about $3*10^9$ N/m² or less.

For example, the Young's modulus (E) can be measured in the manner specified in ASTM D882, which can be measured by cutting the film in the form provided by the relevant standard and using equipment (capable of measuring force and length simultaneously) for measuring a stress-strain curve, for example, a UTM (universal testing machine).

When the Young's modulus (E) of the base layer satisfies the above range, it is advantageous that the flexural rigidity (D) of Equation 1 above has a range of $2.2*10^4$ N·m or more. Therefore, when the liquid crystal element is laminated with an outer substrate, which is described below, to manufacture an optical device, appearance defects such as wrinkles may be reduced.

As one example, the first base layer and the second base layer may each have a thickness ($h_e$) of about 10 μm to about 1,000 μm. In another example, the base layers may each have a thickness ($h_e$) of about 20 μm or more, 40 μm or more, 60 μm or more, 80 μm or more, 100 μm or more, 120 μm or more, 140 μm or more, 160 μm or more, or about 180 μm or more, and may be about 900 μm or less, 800 μm or less, 700 μm or less, 600 μm or less, 500 μm or less, or about 400 μm or less.

When the thickness ($h_e$) of the base layer corresponds to about 100 μm to about 1,000 μm, it is advantageous that the flexural rigidity (D) of Equation 1 above has a range of $2.2*10^{-4}$ N·m or more, and thus, when the liquid crystal element is laminated with an outer substrate, which is described below, to manufacture an optical device, appearance defects such as wrinkles may be reduced.

In one example, the first and second base layers may each have a Poisson's ratio (u) of about 0.25 to about 0.45. As another example, it may be about 0.25 or more, 0.26 or more, 0.27 or more, 0.28 or more, 0.29 or more, or about 0.30 or more, and may be about 0.44 or less, 0.43 or less, 0.42 or less, 0.41 or less, or about 0.40 or less.

The Poisson's ratio (u) is a negative ratio of a lateral deformation ratio (y direction, εy) to an axial deformation ratio (x direction, εx), which can be expressed by the formula of 'Poisson's ratio=−εy/εx.' The Poisson's ratio can be measured by various well-known methods. For example, it can be measured by using a standard size specimens according to the manner specified in ASTM-D638. That is, it can be measured by performing a tension test for a specimen provided with two extensometers. One extensometer is aligned parallel to the applied tensile stress, whereas the second extensometer is aligned perpendicular to the tensile stress, where the tensile stress is applied in the x direction.

When the Poisson's ratio (v) of the above range is satisfied, it is advantageous that the flexural rigidity (D) of Equation 1 above has a range of $2.2*10^{-4}$ N·m or more.

As one example, the first base layer and the second base layer are not particularly limited as long as they have the flexural rigidity (D) of Equation 1 above satisfying $2.2*10^{-4}$ N·m or more, and they can be used as the base layer of the present application. In one embodiment, the first base layer and the second base layer can be each independently used by a PEN (polyethylene-naphthalate) film, a PI (polyimide) film, a COP (cyclo-olefin polymer) film, a TAC (tri-acetyl-cellulose) film, a PET (polyethyleneterephthalate) film or a PC (polycarbonate) film, and the like, without being limited thereto.

The liquid crystal element may comprise a liquid crystal layer containing at least a liquid crystal compound. In one example, the liquid crystal layer is a so-called guest host liquid crystal layer, which may be a liquid crystal layer comprising a liquid crystal compound and a dichroic dye guest.

The liquid crystal layer is a liquid crystal layer using a so-called guest host effect, which is a liquid crystal layer in which the dichroic dye guest is aligned according to an alignment direction of the liquid crystal compound (hereinafter, may be referred to as a liquid crystal host).

The orientation means orientation of an optical axis, and for example, in the case where the liquid crystal compound is in a rod shape, the optical axis may mean the long axis direction and in the case where it is in a discotic shape, it may mean the normal direction of the discotic plane. On the other hand, in the case of comprising a plurality of liquid crystal compounds having different optical axis directions in any orientation state, the optical axis may be defined as an average optical axis, and in this case, the average optical axis may mean a vector sum of the optical axes of the liquid crystal compounds. The alignment direction can be adjusted by application of energy to be described below.

The type of the liquid crystal host used in the liquid crystal layer is not particularly limited, and a general type of liquid crystal compound applied to realize the guest host effect can be used.

For example, as the liquid crystal host, a smectic liquid crystal compound, a nematic liquid crystal compound or a cholesteric liquid crystal compound can be used. In general, a nematic liquid crystal compound can be used. The term nematic liquid crystal compound means a liquid crystal compound that liquid crystal molecules have no regularity with respect to positions but all can be arranged in order along the molecular axis direction. Such a liquid crystal compound may be in a rod form or may be in a discotic form.

As such a nematic liquid crystal compound, one having a clearing point of, for example, about 40° C. or more, 50° C. or more, 60° C. or more, 70° C. or more, 80° C. or more, 90° C. or more, 100° C. or more, or about 110° C. or more, or having a phase transition point in the above range, that is, a phase transition point to an isotropic phase on a nematic phase, can be selected. In one example, the clearing point or phase transition point may be about 160° C. or less, 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than about 3, or more than about 7, or may be less than about −2 or less than about −3.

The liquid crystal compound may also have optical anisotropy (Δn) of about 0.01 or more, or about 0.04 or more. In another example, the optical anisotropy of the liquid crystal compound may be about 0.3 or less, or about 0.27 or less.

Liquid crystal compounds that can be used as liquid crystal hosts for guest host liquid crystal layers are well known to those skilled in the art, and the liquid crystal compound can be selected freely from them.

The liquid crystal layer comprises a dichroic dye guest together with the liquid crystal host. The term dye may mean a material capable of intensively absorbing and/or modifying light in at least a part or the entire range in a visible light region, for example, a wavelength range of 380 nm to 780 nm, and the term dichroic dye guest may mean a material capable of absorbing light in at least a part or the entire range of the visible light region.

As the dichroic dye guest, for example, known dyes known to have properties that can be aligned according to the oriented state of the liquid crystal host may be selected and used. In one embodiment, azo dyes or anthraquinone dyes and the like may be used as the dichroic dye guest, and the liquid crystal layer may also comprise one or two or more dyes in order to achieve light absorption in a wide wavelength range.

A dichroic ratio of the dichroic dye guest can be appropriately selected in consideration of the use purpose of the dichroic dye guest. For example, the dichroic dye guest may have a dichroic ratio of about 5 or more to about 20 or less. The term dichroic ratio may mean a value obtained by dividing absorption of polarized light parallel to the long axis direction of the dye by absorption of polarized light parallel to the direction perpendicular to the long axis direction, in the case of a p-type dye. The dichroic dye guest may have the dichroic ratio in at least one wavelength, some range of wavelengths or full range of wavelengths within the wavelength range of the visible light region, for example, within the wavelength range of about 380 nm to about 780 nm or about 400 nm to about 700 nm.

The content of the dichroic dye guest in the liquid crystal layer may be appropriately selected in consideration of the use purpose of the dichroic dye guest. For example, the content of the dichroic dye guest may be selected in a range of about 0.1 wt % to about 10 wt % based on the total weight of the liquid crystal host and the dichroic dye guest. The ratio of the dichroic dye guest may be changed in consideration of the transmittance of the liquid crystal element to be described below and the solubility of the dichroic dye guest in the liquid crystal host, and the like.

The liquid crystal layer basically comprises the liquid crystal host and the dichroic dye guest, and may further comprise other optional additives according to a known form, if necessary. As an example of the additive, a chiral dopant or a stabilizer can be exemplified, without being limited thereto.

The liquid crystal element may further comprise a spacer for maintaining a gap of the base layers between the first base layer and a second base layer and/or a sealant capable of attaching the first base layer and the second base layer in a state where the gap of the first base layer and the second base layer is maintained. As the material of the spacer and/or the sealant, a known material can be used without any particular limitation.

Figure 2:
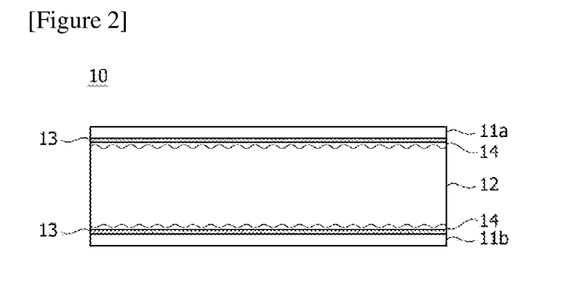

The liquid crystal element may further comprise a conductive layer and/or an alignment film. FIG. 2 exemplarily shows a liquid crystal element according to one example including a conductive layer and an alignment film. As shown in FIG. 2, the liquid crystal element (10) may have a structure that a first base layer (11a), a conductive layer (13), an alignment film (14), a liquid crystal layer (12), an alignment film (14), a conductive layer (13) and a second base layer (11b) are laminated sequentially.

The conductive layer (13) may be formed on each of the first base layer and the second base layer (11a, 11b). In addition, the conductive layer (13) may be formed on the surface facing the liquid crystal layer (12). The conductive layer (13) present on the surface of the base layer is a constitution for applying a voltage to the liquid crystal layer (12), to which a known conductive layer can be applied without particular limitation. As the conductive layer, for example, a conductive polymer, a conductive metal, a conductive nanowire, or a metal oxide such as ITO (indium tin oxide) can be applied. Examples of the conductive layer that can be applied in the present application are not limited to the above, and all kinds of conductive layers known to be applicable to the liquid crystal element in this field can be used.

The alignment film (14) may be present on the surfaces of the first base layer and the second base layer (11a, 11b). For example, the conductive layer (13) may be formed first on one side of the base layer, and the alignment film (14) may be formed thereon.

The alignment film (14) is a constitution for controlling orientation of the liquid crystal host included in the liquid crystal layer (12), and a known alignment film can be applied without particular limitation. As the alignment film known in the industry, there is a rubbing alignment film or a photo alignment film, and the like, and the alignment film that can be used in the present application is the known alignment film, which is not particularly limited.

In order to achieve the orientation of the optical axis as described above, the alignment direction of the alignment film (14) may be controlled. For example, the alignment directions of the two alignment films formed on the respective surfaces of the first base layer and the second base layer disposed opposite to each other may form an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees to each other, or may be approximately parallel to each other. In another example, the alignment directions of the two alignment films may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or may be approximately perpendicular to each other.

Since the direction of the optical axis of the liquid crystal layer is determined in accordance with such an alignment direction, the alignment direction can be known by checking the direction of the optical axis of the liquid crystal layer. A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as P-2000 from Jasco.

The shape of the liquid crystal element having such a structure is not particularly limited, which may be determined according to the application of the optical device, and is generally in the form of a film or a sheet.

The liquid crystal element may switch between at least two or more optical axis oriented states, for example, first and second oriented states. The oriented state in such a liquid crystal element can be changed by applying energy, for example, by applying a voltage. That is, the liquid crystal element may have any one of the first and second oriented states in a state without voltage application, and may be switched to another oriented state when a voltage is applied. On the other hand, the transmittance may be adjusted according to the oriented state of the liquid crystal element. In one example, the black mode may be implemented in any one of the first and second oriented states, and the transparent mode may be implemented in another oriented state.

The transparent mode is a state where the liquid crystal element exhibits relatively high transmittance, and the black mode is a state where the liquid crystal element exhibits relatively low transmittance.

In one example, the liquid crystal element may have transmittance in the transparent mode of about 20%, 25%, 30% or more, 35% or more, 40% or more, 45% or more, or about 50% or more. Also, the liquid crystal element may have transmittance in the black mode of less than about 20%, less than 15%, or less than about 10%.

The higher the transmittance in the transparent mode is, the more advantageous it is, and the lower the transmittance in the black mode is, the more advantageous it is, so that each of the upper limit and the lower limit is not particularly limited. In one example, the upper limit of the transmittance in the transparent mode may be about 100%, 95%, 90%, 85%, 80%, 75%, 70%, 65% or about 60%. The lower limit of the transmittance in the black mode may be about 0%, 1%, 2%, 3%, 4%, 5%, 6%, 7%, 8%, 9%, or about 10%.

The transmittance may be linear light transmittance. The term linear light transmittance may be a ratio of, relative to light which is incident on the liquid crystal element in a predetermined direction, light (linear light) transmitted through the liquid crystal element in the same direction as the incident direction. In one example, the transmittance may be a result of measurement (normal light transmittance) with respect to light incident in a direction parallel to the surface normal of the liquid crystal element.

In the liquid crystal element of the present application, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

If desired, the liquid crystal element may also be designed to be capable of implementing other modes besides the transparent mode and the black mode. For example, it may also be designed to be capable of implementing a third mode which may represent any transmittance between the transmittance of the transparent mode and the transmittance of the black mode.

Figure 3:
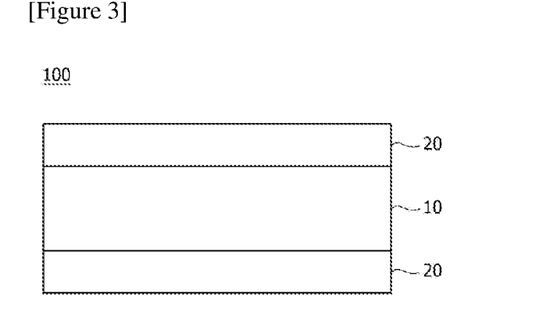
FIGS. 3 to 5 are exemplary cross-sectional views showing exemplary optical devices of the present application.

The optical device of the present application may comprise first and second outer substrates. The expressions of first and second do not prescribe the front-and-rear or up-and-down relationship. In one example, the liquid crystal element may be positioned between the first and second outer substrates. For example, as shown in FIG. 3, the liquid crystal element (10) may be positioned between the first and second outer substrates (20) disposed opposite to each other.

As the first and second outer substrates (20), for example, each independently, an inorganic substrate such as glass, or a plastic substrate can be used. As the plastic substrate, a cellulose film such as TAC (triacetyl cellulose) or DAC (diacetyl cellulose); a COP (cycloolefin polymer) film such as norbornene derivatives; an acryl film such as PAR (polyacrylate) or PMMA (poly(methyl methacrylate); a PC (polycarbonate) film; a polyolefin film such as PE (polyethylene) or PP (polypropylene); a PVA (polyvinyl alcohol) film; a PI (polyimide) film; a PSF (polysulfone) film; a PPS (polyphenylsulfone) film; a PES (polyether sulfone) film; a PEEK (polyetheretherketone) film; a PEI (polyetherimide) film; a PEN (polyethylenenaphthalate) film; a PET (polyethyleneterephtalate) film; or a fluororesin film and the like can be used, without being limited thereto. A coating layer of gold; silver; or a silicon compound such as silicon dioxide or silicon monoxide, or a functional layer such as an antireflection layer may also be present on the first and second outer substrates (20), if necessary.

The thicknesses of the first and second outer substrates (20) as above are not particularly limited, and each may be, for example, about 0.3 mm or more. In another example, the thickness may be about 0.5 mm or more, 1 mm or more, 1.5 mm or more, or about 2 mm or more, and may also be about 10 mm or less, 9 mm or less, 8 mm or less, 7 mm or less, 6 mm or less, 5 mm or less, 4 mm or less, or about 3 mm or less.

The first and second outer substrates (20) may be flat substrates or may be substrates having a curved surface shape. For example, the first and second outer substrates may be simultaneously flat substrates, simultaneously have a curved surface shape, or any one may be a flat substrate and the other may be a substrate having a curved surface shape.

Here, in the case of having the curved surface shape at the same time, the respective curvatures or curvature radii may also be the same or different.

In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

In addition, with respect to the first and second outer substrates, for example, when the curvatures or the curvature radii at the front surface and the back surface are different from each other, the curvatures or curvature radii of the respective facing surfaces, that is, the curvature or curvature radius of the surface facing the second outer substrate in the case of the first outer substrate and the curvature or curvature radius of the surface facing the first outer substrate in the case of the second outer substrate may be a reference. Furthermore, when the relevant surface has portions that the curvatures or curvature radii are not constant and different, the largest curvature or curvature radius may be a reference, the smallest curvature or curvature radius may be a reference, or the average curvature or average curvature radius may be a reference.

Both of the first and second outer substrates may have a difference in curvature or curvature radius within about 10%, within 9%, within 8%, within 7%, within 6%, within 5%, within 4%, within 3%, within 2% or within about 1%. When a large curvature or curvature radius is $C_L$ and a small curvature or curvature radius is $C_S$, the difference in curvature or curvature radius is a value calculated by $100\times(C_L-C_S)/C_S$. In addition, the lower limit of the difference in curvature or curvature radius is not particularly limited. Since the differences in curvatures or curvature radii of the first and second outer substrates can be the same, the difference in curvature or curvature radius may be about 0% or more, or may be more than about 0%.

When both the first and second outer substrates are curved surfaces, both curvatures may have the same sign. In other words, the first and second outer substrates may be bent in the same direction. That is, in the above case, both the center of curvature of the first outer substrate and the center of curvature of the second outer substrate exist in the same portion of the upper part and the lower part of the first and second outer substrates.

The specific range of each curvature or curvature radius of the first and second outer substrates is not particularly limited. In one example, the first and second outer substrates each have a curvature radius of about 100R or more, 200R or more, 300R or more, 400R or more, 500R or more, 600R or more, 700R or more, 800R or more, or about 900R or more, or may be about 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or about 1,050R or less. Here, R denotes a degree of curvature of a circle having a radius of 1 mm. Thus, here, for example, 100R is the degree of curvature of a circle with a radius of 100 mm or the curvature radius for such a circle. Of course, in the case of a flat surface, the curvature is zero and the curvature radius is infinite.

The first and second outer substrates may have the same or different curvature radii in the above range. In one example, when the curvatures of the first and second outer substrates are different from each other, the curvature radius of the substrate having a large curvature among them may be within the above range.

In one example, when the curvatures of the first and second outer substrates are different from each other, a substrate having a large curvature among them may be a substrate that is disposed in the gravity direction upon using the optical device.

When the curvatures or curvature radii of the first and second outer substrates are controlled as described above, the net force which is the sum of the restoring force and the gravity may act to prevent the widening and also to withstand the same process pressure as the autoclave, even if the adhesion force by an adhesive film, which is described below, is lowered.

Figure 4:
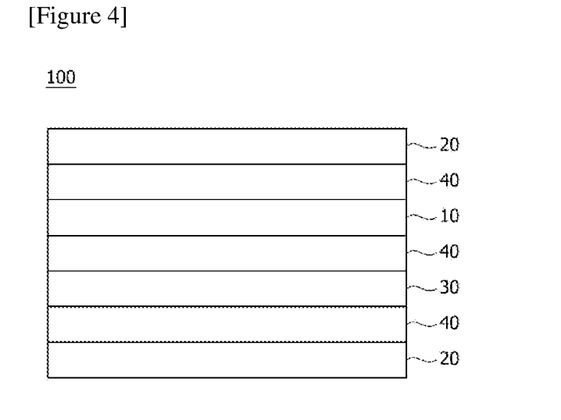

The optical device of the present application may further comprise a polarizer and/or an adhesive film. FIG. 4 exemplarily shows an optical device according to one example including a polarizer and an adhesive film. As shown in FIG.

4, the optical device (100) may have a structure that a first outer substrate (20), an adhesive film (40), a liquid crystal element (10), an adhesive film (40), a polarizer (30), an adhesive film (40) and a second outer substrate (20) are laminated sequentially.

As the polarizer (30), for example, an absorbing linear polarizer, that is, a polarizer having a light absorption axis formed in one direction and a light transmission axis formed approximately perpendicular thereto may be used.

Assuming that the blocking state is implemented in the first oriented state of the liquid crystal element (10), the polarizer (30) may be disposed in the optical device such that the angle formed by an average optical axis (vector sum of optical axes) of the first oriented state and the light absorption axis of the polarizer is about 80 degrees to about 100 degrees or about 85 degrees to about 95 degrees, or it is approximately perpendicular, or may be disposed in the optical device such that it is about 35 degrees to about 55 degrees or about 40 degrees to about 50 degrees or approximately 45 degrees.

When the alignment direction of the alignment film is used as a reference, the alignment directions of the alignment films formed on each side of the first and second base layers as described above may form, to each other, an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees, or in the case of being approximately parallel to each other, the angle formed by the alignment direction of any one of the two alignment films and the light absorption axis of the polarizer may be about 80 degrees to about 100 degrees or about 85 degrees to about 95 degrees, or may be approximately perpendicular.

In another example, the alignment directions of the two alignment films may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or in the case of being approximately vertical to each other, the angle formed by the alignment direction of the alignment film disposed closer to the polarizer of the two alignment films and the light absorption axis of the polarizer may be about 80 degrees to about 100 degrees or about 85 degrees to about 95 degrees, or may be approximately perpendicular.

The kind of the polarizer that can be applied in the optical device of the present application is not particularly limited. For example, as the polarizer, a conventional material used in conventional LCDs or the like, such as a PVA (poly(vinyl alcohol)) polarizer, or a polarizer implemented by a coating method such as a polarizing coating layer comprising lyotropic liquid crystals (LLCs) or reactive mesogens (RMs) and a dichroic dye can be used. In this specification, the polarizer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of about 30 to about 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only each one of the liquid crystal element and the polarizer as described above. Thus, the optical device may comprise only one liquid crystal element and may comprise only one polarizer.

As shown in FIG. 4, the adhesive film (40) may be present, for example, between the outer substrate (20) and the liquid crystal element (10), between the liquid crystal element (10) and the polarizer (30), and between the polarizer (30) and the outer substrate (20), and may be present on the sides of the liquid crystal element (10) and the polarizer (30), and suitably on all sides.

On the other hand, the adhesive film located between the outer substrate (20) and the liquid crystal element (10), between the liquid crystal element (10) and the polarizer (30), between the polarizer (30) and the outer substrate (20) and/or on the sides of the liquid crystal element (10) and the polarizer (30) may be the same or different adhesive films.

The adhesive film (40) may seal the liquid crystal element (10) and the polarizer (30) while bonding the outer substrate (20) and the liquid crystal element (10), the liquid crystal element (10) and the polarizer (30), and the polarizer (30) and the outer substrate (20) to each other. In the present application, the term sealing (or encapsulation) may mean covering the top surface of the liquid crystal element and/or the polarizer with an adhesive film. For example, the structure may be implemented by a method of laminating the outer substrate, the liquid crystal element, the polarizer and the adhesive film according to the desired structure and then compressing them in a vacuum state.

As the adhesive film (40), a known material may be used without particular limitation, and it can be selected from, for example, a thermoplastic polyurethane adhesive film (TPU: thermoplastic polyurethane), TPS (thermoplastic starch), a polyamide adhesive film, a polyester adhesive film, an EVA (ethylene vinyl acetate) adhesive film, a polyolefin adhesive film such as polyethylene or polypropylene, or a polyolefin elastomer film (POE film), and the like, which is known.

The thickness of the adhesive film as above is not particularly limited, which may be, for example, in a range of about 200 µm to about 600 µm or so. Here, the thickness of the adhesive film is the thickness of the adhesive film between the outer substrate (20) and the liquid crystal element (10), for example, the gap between the two; the thickness of the adhesive film between the liquid crystal element (10) and the polarizer (30), for example, the gap between the two; and the thickness of the adhesive film between the polarizer (30) and the outer substrate (20), for example, the gap between the two.

The optical device may further comprise any necessary configuration other than the above configurations, and for example, comprise a known configuration such as a buffer layer, a retardation layer, an optical compensation layer, an antireflection layer or a hard coating layer in a proper position.

The method of manufacturing the optical device of the present application is not particularly limited. In one example, the optical device may be manufactured through an autoclave process for the above-described encapsulation.

For example, the method of manufacturing the optical device may comprise a step of encapsulating a liquid crystal element and/or a polarizer between first and second outer substrates disposed opposite to each other through an autoclave process using an adhesive film.

The autoclave process may be performed by arranging the adhesive film, and the liquid crystal element and/or the polarizer according to the desired encapsulation structure between the outer substrates, and heating/pressing them.

Figure 5:
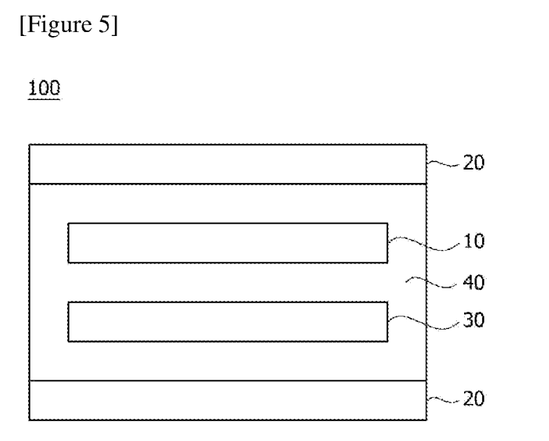

For example, an optical device as shown in FIG. 5 can be formed by heating/pressing a laminate, in which an outer substrate (20), an adhesive film (40), a liquid crystal element (10), an adhesive film (40), a polarizer (30), an adhesive film (40) and an outer substrate (20) are arranged in this order and an adhesive film (40) is also disposed on the sides of the liquid crystal element (10) and the polarizer (30), in an autoclave process.

The conditions of the autoclave process are not particularly limited, and for example, the process can be performed under appropriate temperature and pressure depending on the kind of the applied adhesive film. The temperature of a typical autoclave process is about 80° C. or more, 90° C. or more, or about 100° C. or more, and the pressure is 2 atm or more, without being limited thereto. The upper limit of the process temperature may be about 200° C. or less, 190° C. or less, 180° C. or less, or about 170° C. or less or so, and the upper limit of the process pressure may be about 10 atm or less, 9 atm or less, 8 atm or less, 7 atm or less, or about 6 atm or less or so.

Such an optical device can be used for various applications, and for example, can be used for eyewear such as sunglasses or AR (augmented reality) or VR (virtual reality) eyewear, an outer wall of a building or a sunroof for a vehicle, and the like.

In one example, the optical device itself may be a sunroof for a vehicle.

For example, in an automobile including a body in which at least one opening is formed, the optical device or the sunroof for a vehicle attached to the opening can be mounted and used.

Advantageous Effects

The present application can provide an optical device capable of varying the transmittance and with improved appearance defects, such as reduction of wrinkles that may occur according to lamination of a liquid crystal element and an outer substrate. Such an optical device can be used for various applications such as eyewear, for example, sunglasses or AR (augmented reality) or VR (virtual reality) eyewear, an outer wall of a building or a sunroof for a vehicle.

DETAILED DESCRIPTION

Hereinafter, the present application will be described in detail through Examples and Comparative Examples, but the scope of the present application is not limited by the following Examples.

Method of Measuring Appearance Defects

Appearance defects were measured in a state where the liquid crystal elements manufactured in Example 1, Example 2 and Comparative Example were encapsulated between the first and second outer substrates after an autoclave process. When the liquid crystal element encapsulated between the first and second outer substrates was applied to a high temperature long-term durability test (maintained at a temperature of 100° C. for about 168 hours) and left at room temperature for 24 hours or more, the appearance defects of the optical device were measured by confirming whether or not wrinkles were generated on the appearance of the optical device.

Example 1

Liquid Crystal Element

As the first and second base layers, a polycarbonate film (thickness: 300 μm, manufacturer: Keiwa Corporation) having a flexural rigidity (D) of about $5.73*10^{-3}$ N·m was used, and ITO (indium-tin-oxide) was deposited to a thickness of 200 nm on each of the first base layer and the second base layer to form a conductive layer. A horizontal alignment film (SE-7492, Nissan Chemical Co., Ltd.) was coated to a thickness of 100 to 300 nm on the conductive layer and cured to form first and second alignment films.

[98] A sealant was applied to the outer circumference of the first alignment film, a liquid crystal (MDA 14-4145, manufactured by Merck) was applied to the inner region of the sealant, and the second alignment film was laminated to manufacture a liquid crystal element. The area of the manufactured liquid crystal element is 600 mm×300 mm, and the cell gap is 12 μm.

Optical Device

A first outer substrate, an adhesive film, the liquid crystal element, an adhesive film, a polarizer, an adhesive film and a second outer substrate were laminated in this order, and the adhesive film was also disposed on all sides of the liquid crystal element to produce a laminate (the second outer substrate was arranged in the gravity direction as compared to the first outer substrate).

As the first and second outer substrates, glass substrates having a thickness of about 3 mm or so were used, where a substrate having a curvature radius of about 2,470R (first outer substrate) and a substrate having a curvature radius of about 2,400R (second outer substrate) were used. On the other hand, a thermoplastic polyurethane adhesive film (thickness: about 0.38 mm, manufacturer: Argotec, product name: ArgoFlex) was used as the adhesive film.

The laminate was subjected to an autoclave process at a temperature of about 105° C. and a pressure of about 2 atm to produce an optical device.

Example 2

A liquid crystal element and an optical device were produced in the same manner as in Example 1, except that as the first and second base layers of the liquid crystal element, a polyethylene terephthalate (thickness: 145 μm, manufacturer: SKC Company) film having a flexural rigidity (D) of about $8.17*10^{-4}$ N·m or so was used.

Comparative Example

A liquid crystal element and an optical device were produced in the same manner as in Example 1, except that as the first and second base layers of the liquid crystal element, a polycarbonate film (thickness: 100 μm, manufacturer: Keiwa Co., Ltd.) having a flexural rigidity (D) of about $2.12*10^{-4}$ N·m was used.

Figure 6:
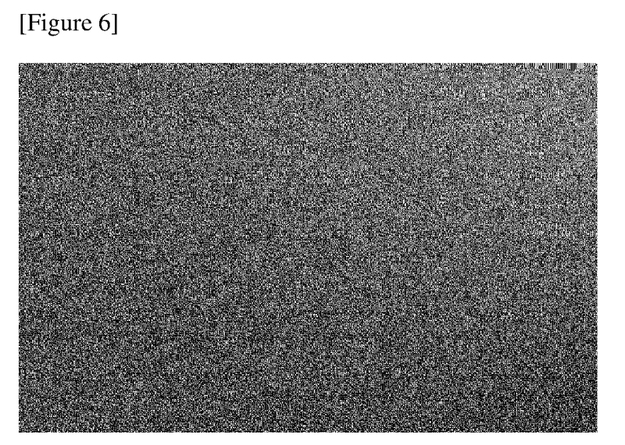
FIGS. 6 to 8 are images photographed by using a digital camera after applying optical devices manufactured according to Example 1, Example 2 and Comparative Example to a high temperature long-term durability test.
Figure 7:
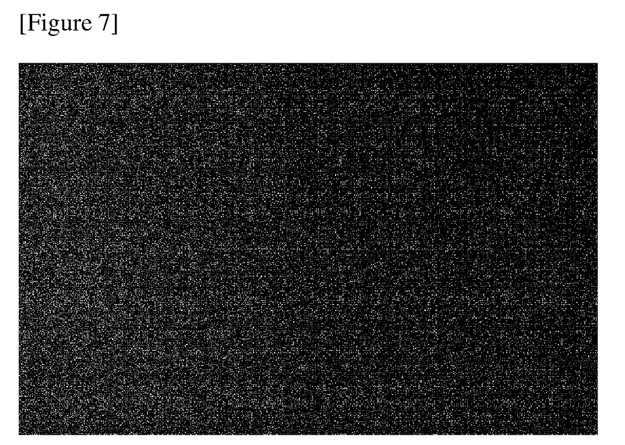
Figure 8:
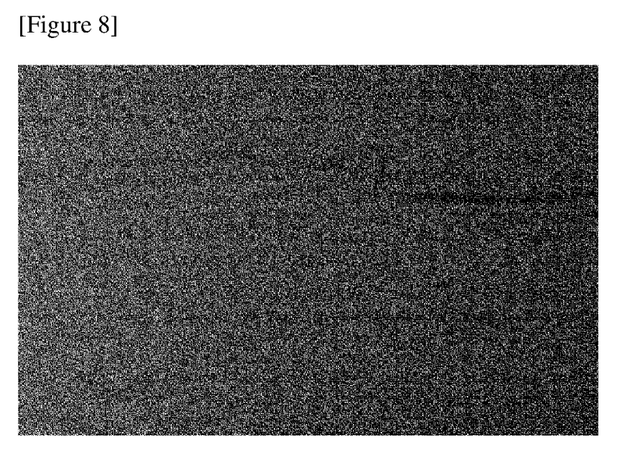

FIGS. 6 to 8 are photographs of the optical device after the durability test, where FIG. 6 is a device photograph of Example 1, FIG. 7 is a device photograph of Example 2, and FIG. 8 is a device photograph of Comparative Example. It can be confirmed from the optical devices of Examples 1 and 2 that the optical devices have been manufactured stably without appearance defects such as wrinkles, and in contrast, it can be confirmed from the device of Comparative Example that appearance defects such as wrinkles have been generated.

The invention claimed is:

1. An optical device comprising:
   first and second outer substrates;
   a liquid crystal element positioned between the first and second outer substrates; and
   an adhesive film,
   wherein the liquid crystal element comprises a structure in which a first base layer, a liquid crystal layer and a second base layer are sequentially laminated,
   wherein the adhesive film forms an autoclaved encapsulation structure between the first outer substrate and the liquid crystal element, between the second outer substrate and the liquid crystal element and on a side of the liquid crystal element,
   wherein one or more of the first base layer and or the second base layer have a flexural rigidity (D) of $2.2*10^{-4}$ N·m or more, the flexural rigidity (D) as represented by Equation 1 below $$D = \frac{Eh_e^3}{12(1-\upsilon^2)} \qquad \text{[Equation 1]}$$

wherein, D is the flexural rigidity of the base layer, E is a Young's modulus of the base layer, $h_e$ is a thickness of the base layer, and $\upsilon$ is a Poisson's ratio of the base layer.

2. The optical device according to claim 1, wherein the first base layer and the second base layer each have a flexural rigidity (D) of $2.2*10^{-4}$ N·m or more, as represented by Equation 1.

3. The optical device according to claim 1, wherein the first base layer and the second base layer each have a Young's modulus of $1*10^9$ N/m² to $1*10^{10}$ N/m².

4. The optical device according to claim 1, wherein the first base layer and the second base layer each have a thickness ($h_e$) of 10 μm to 1,000 μm.

5. The optical device according to claim 1, wherein the first base layer and the second base layer are each independently a PEN (polyethylene-naphthalate) film, a PI (polyimide) film, a COP (cyclo-olefin polymer) film, a TAC (tri-acetyl-cellulose) film, a PET (polyethyleneterephthalate) film or a PC (polycarbonate) film.

6. The optical device according to claim 1, wherein the liquid crystal layer comprises a dichroic dye guest.

7. The optical device according to claim 1, wherein the liquid crystal element comprises a conductive layer formed on each of the first base layer and the second base layer.

8. The optical device according to claim 7, wherein the liquid crystal element comprises an alignment film formed on the conductive layer.

9. The optical device according to claim 1, wherein the liquid crystal element is capable of switching between first and second oriented states.

10. The optical device according to claim 1, further comprising a polarizer positioned between the first and second outer substrates.

11. The optical device according to claim 10, wherein the adhesive film is positioned between the first outer substrate and the liquid crystal element, between the liquid crystal element and the polarizer, and between the second outer substrate and the polarizer.

12. An automobile comprising a body on which one or more openings are formed; and the optical device of claim 1 mounted on the openings.

13. The optical device according to claim 10, wherein the adhesive film encapsulates the polarizer.

* * * * *